(12) United States Patent
Liu et al.

(10) Patent No.: US 12,514,363 B2
(45) Date of Patent: Jan. 6, 2026

(54) MODULAR LINEAR ACTUATOR AND HEIGHT ADJUSTABLE DESK

(71) Applicant: CHANGZHOU KAIDI ELECTRICAL INC, Jiangsu (CN)

(72) Inventors: Yutao Liu, Jiangsu (CN); Gengxing Zhu, Jiangsu (CN)

(73) Assignee: CHANGZHOU KAIDI ELECTRICAL INC, Jiangsu (CN)

( * ) Notice: Subject to any disclaimer, the term of this patent is extended or adjusted under 35 U.S.C. 154(b) by 0 days.

(21) Appl. No.: 18/027,349

(22) PCT Filed: Sep. 26, 2020

(86) PCT No.: PCT/CN2020/117958
§ 371 (c)(1),
(2) Date: Mar. 20, 2023

(87) PCT Pub. No.: WO2022/016705
PCT Pub. Date: Jan. 27, 2022

(65) Prior Publication Data
US 2023/0404254 A1    Dec. 21, 2023

(30) Foreign Application Priority Data
Jul. 21, 2020 (CN) .......................... 202010707559.3

(51) Int. Cl.
*A47B 9/04* (2006.01)
*A47B 13/00* (2006.01)

(52) U.S. Cl.
CPC .............. *A47B 9/04* (2013.01); *A47B 13/003* (2013.01); *A47B 2009/046* (2013.01); *A47B 2200/0057* (2013.01)

(58) Field of Classification Search
CPC ... A47B 9/04; A47B 13/003; A47B 2009/046; A47B 2200/0057

(Continued)

(56) References Cited

U.S. PATENT DOCUMENTS 6,478,269 B2 * 11/2002 Forsberg .................. A47B 9/00
248/404
6,595,144 B1 * 7/2003 Doyle ...................... A47B 9/00
248/188.4

(Continued)

FOREIGN PATENT DOCUMENTS

CN        103986268 A      8/2014
CN        204243993 U      4/2015

(Continued)

OTHER PUBLICATIONS

International Search Report (with partial translation) and Written Opinion dated Apr. 21, 2021, issued in corresponding International Patent Application No. PCT/CN2020/117958.

(Continued)

*Primary Examiner* — Daniel J Troy
*Assistant Examiner* — Timothy M Ayres
(74) *Attorney, Agent, or Firm* — Morgan, Lewis & Bockius LLP

(57) ABSTRACT

A modular linear actuator and a height adjustable desk. The modular linear actuator comprises an actuator body module and a motor box module, the motor box module is detachably mounted at an end portion of the actuator body module, and the motor box module outputs the power of a motor to the actuator body module by means of a transmission device. The height adjustable desk comprises a desk plate, a desk frame, and the modular linear actuator. The desk frame is mounted on the actuator body module of the modular linear actuator. The modular linear actuator can be detached and recycled when being scrapped, which reduces the recycling cost and prolong the service life of a product. The motor box modules having different motor models are matched and combined with a plurality of actuator body modules. It (Continued)

enables the use of fewer product types to satisfy more performance requirements.

14 Claims, 5 Drawing Sheets

(58) Field of Classification Search
 USPC .................................................. 108/144.11
 See application file for complete search history.

(56) References Cited

U.S. PATENT DOCUMENTS

| | | | | |
|---|---|---|---|---|
| 7,495,359 | B2* | 2/2009 | Klinke | A47B 9/04 310/83 |
| 7,506,560 | B2* | 3/2009 | Klinke | F16D 49/20 192/223.4 |
| 8,752,488 | B2* | 6/2014 | Moller | A47B 9/04 108/147.19 |
| 9,018,813 | B2* | 4/2015 | Randlov | A47B 9/04 403/403 |
| 9,848,696 | B2* | 12/2017 | Tseng | A47B 9/04 |
| 10,094,456 | B2* | 10/2018 | Hu | F16H 57/0006 |
| 10,436,242 | B2* | 10/2019 | Hu | B66F 3/10 |
| 10,524,564 | B1* | 1/2020 | Wu | A47B 9/20 |
| 10,531,732 | B1* | 1/2020 | Huang | F16B 7/14 |
| 10,588,401 | B1* | 3/2020 | Lu | A47B 9/04 |
| 10,729,233 | B2* | 8/2020 | Knudtson | A47C 3/40 |
| 10,758,036 | B2* | 9/2020 | Lu | A47B 9/04 |
| 11,357,320 | B2* | 6/2022 | Jørgensen | A47B 3/0812 |
| 11,596,221 | B2* | 3/2023 | Lin | A47B 9/04 |
| 11,684,152 | B2* | 6/2023 | Zhu | F16B 12/38 108/157.1 |
| 2016/0047446 | A1* | 2/2016 | Hung | A47B 9/04 74/89.35 |
| 2018/0140087 | A1* | 5/2018 | Wu | F16H 25/2056 |
| 2019/0072161 | A1 | 3/2019 | Zhong et al. | |
| 2022/0047068 | A1* | 2/2022 | Tsai | A47B 9/04 |
| 2022/0243793 | A1* | 8/2022 | Hu | F16H 25/2454 |
| 2023/0000244 | A1* | 1/2023 | Lin | A47B 9/04 |
| 2024/0008636 | A1* | 1/2024 | Li | A47B 9/08 |

FOREIGN PATENT DOCUMENTS

| | | |
|---|---|---|
| CN | 204908434 U | 12/2015 |
| CN | 210053296 U | 2/2020 |
| CN | 211632173 U | 10/2020 |
| CN | 212489001 U | 2/2021 |
| DE | 202011100233 U1 | 7/2011 |
| EP | 1201154 A1 | 5/2002 |
| KR | 200349551 Y1 | 5/2004 |

OTHER PUBLICATIONS

International Preliminary Report on Patentability dated Oct. 31, 2022, issued in corresponding International Patent Application No. PCT/CN2020/117958.
Changzhou Kaidi Electrical, Inc., Extended European Search Report, EP Patent Application No. 20945784.5, Feb. 2, 2024, 7 pgs.
Changzhou Kaidi Electrical, Inc., Chinese Office Action, CN Patent Application No. 202010707559.3, Aug. 24, 2024, 15 pgs.
Changzhou Kaidi Electrical, Inc., Chinese Office Action, CN Patent Application No. 202010707559.3, Feb. 21, 2025, 17 pgs.

* cited by examiner

MODULAR LINEAR ACTUATOR AND HEIGHT ADJUSTABLE DESK

TECHNICAL FIELD

This disclosure relates to the technical field of linear actuator, in particular, a modular linear actuator and a height adjustable desk.

BACKGROUND

In the fields of office and household, electrical lifting platforms like the electrical height adjustable desk are receiving increasing popularity. Conventionally, the electrical lifting platforms adopt the linear actuators to rise or fall, and the linear actuator used in the electrical lifting platform is also known as height adjustable desk fader, height adjustable desk leg, or lifting upright column.

At present, the linear actuators for the electrical lifting platforms are of an integrated assembly structure, by which an end of the lifting column of the linear actuator is fixed connected to a drive box, and a motor is assembled within the drive box to drive the linear actuator. Dismantling an assembled linear actuator is complicated, unable to change the performance features of the linear actuator conveniently by replacing main parts like the motor, while customers vary in their requirements on the performance of the electrical height adjustable desk and linear actuator. For this purpose, there is a need to produce hundreds of meticulously subdivided actuating products, which, will not only increase the difficulty and cost of manufacturing and management, but also have difficulty in preparing and supplying the goods.

Moreover, as per the instructions of European Waste Electrical and Electronic Equipment (WEEE ( ), enterprises are required to bear the expenses of recycling the scrapped products depending on the net weights of complete systems or components. As the current linear actuators are of an integrated assembly structure, dismantling and scraping the built-in electronic equipment like motor will not be easy. If the actuator is scrapped as an overall product, the enterprises will be facing huge recycling expenses.

SUMMARY

This disclosure is intended to solve the technical problems as follows: as the current linear actuators are of integrated assembly structures, dismantling them will be difficult and complicated, and it will be less possible to replace parts conveniently. Meanwhile, as per the European WEEE instructions, the expenses for recycling scrapped products will cost hugely.

This disclosure adopts a technical solution to the technical problem as follows: A modular linear actuator includes an actuator body module and a motor box module, the motor box module contains a motor box, and a motor and a transmission device, both the motor and transmission device are mounted inside the motor box, the motor box module is detachably mounted at an end portion of the actuator body module, and the motor box module outputs the motor's power to the actuator body module through the transmission device, enabling the actuator body module to perform linear actions.

Furthermore, the motor box module is detachably mounted at the end portion of the actuator body module through a buckle structure between the motor box module and the actuator body module.

Furthermore, the motor box module is detachably mounted at the end portion of the actuator body module in the direction of the linear action of the actuator body module.

Furthermore, the transmission device of the motor box module and the actuator body module perform transmission engagement through a spline pair formed by multi-teeth internal and the external splines.

Furthermore, the actuator body module contains pipe fittings for the lifting column and a turn-screw module to drive the lifting column to rise or fall; an end plate is provided at the end portion of the piping fittings for the lifting column; a driving input end of the turn-screw module is located on the end plate; the motor box module is detachably mounted on the end plate; the transmission device and the driving input end perform transmission engagement; and the end plate is equipped with an assembly structure, which is used to assemble the modular linear actuator and lifting platform and located outside of the motor box module.

Furthermore, the transmission device includes a transmission frame, and a worm wheel mounted on the transmission frame; the transmission frame is mounted on the motor; the motor shaft of the worm wheel motor is equipped with a worm engaging with a side of the worm wheel; the motor box module and the actuator body module perform transmission engagement through an end of the worm wheel; and the motor box is equipped with an opening to expose the end of the worm wheel.

Furthermore, the actuator body module contains pipe fittings for the lifting column, and turn-screw module driving the pipe fittings for the lifting column to rise or fall; the end of the pipe fittings is equipped with an end plate; the driving input end is located on the end plate; the drive input end is the dependent transmission component mounted on the head end of the screw rod of the turn-screw module; or the driving input end is the head end of the screw rod of the turn-screw module per se; the motor box module is detachably mounted on the end plate; the end plate is equipped with an assembly structure matching the frame of the height adjustable desk, which is used for the assembly of the modular linear actuator and the height adjustable desk frame; the assembly structure is located outside of the motor box module; the transmission device contains a transmission frame, and a worm wheel mounted on the transmission frame; the transmission frame is mounted on the motor, whose motor shaft is equipped with the worm which engages with a side of the worm wheel; the transmission device and the actuator body module perform transmission engagement through a spline pair formed by the multi-teeth internal and the external splines with the following specific structure: an end of worm wheel is equipped with a multi-teeth internal spline hole and the driving input end is equipped with a multi-teeth external spline hole so that when the motor box module is connected to the actuator body module, the driving input end is inserted in the multi-teeth internal spline hole and the motor box is equipped with an opening exposing the end of worm wheel.

Furthermore, the bottom of the motor box is equipped with a bulging buckle and the end plate of the actuator body module is equipped with a buckle hole so that the buckle and the buckle hole form a buckle structure and the motor box is detachably connected to the actuator body module by way of snapping the buckle into the buckle hole.

Still furthermore, the buckle is of columnar multi-claw type. The bottom of the motor box is further equipped with a positioning column. The actuator body module is equipped with a positioning hole matching the positioning column to provide assistant positioning to the motor box, and the assembly structure on the end plate is specifically horizontal mounting boards which extend outwards from both sides of the end plate. The horizontal mounting boards contains a mounting hole.

Furthermore, flexible damping material is provided between the motor and the motor box, and the motor box is of a two-piece unit structure containing an upper cover and a lower cover.

Still furthermore, a circle of continuous or intermittent motor-locating wall is provided inside the motor box of the motor box module. The motor is embedded in the motor-locating wall. The sides of the motor are limited by the motor-locating wall. The top surface and bottom surface of the motor are limited by the inner top surface and inner bottom surface of the motor box. The motor-locating wall is located on at least one of the upper cover and lower cover. The flexible damping material are located at least one of: between the top surface of the motor and the inner top surface of the motor box; and between the bottom surface of the motor and the inner bottom surface of the motor box. The long edge of the motor box is equipped with a plurality of hand-grasp grooves on its both sides, and the side of the motor box is equipped with a through wires hole.

A height adjustable desk comprises a desk plate, a desk frame, and the module linear actuator, where the desk plate is mounted on the desk frame and the desk frame is mounted on the actuator body module of the modular linear actuator.

This disclosure has the beneficial effects as follows: when a modular linear actuator is being scrapped, the motor box module with a built-in motor may be dismantled from the modular linear actuator for recycling, which thus reduces the net weight of the scrapped electronic equipment, and reduces the expenses of scrappage and recycling for enterprises;

The modular actuator body module and motor box module may extend the service life of the product, and in the case of parts suffering wear and tear, the corresponding modules may be replaced individually, thus reducing waste;

By collocating and combining motor box modules of different motor models and a plurality of actuator body modules, many requirements on performance may be met using a few kinds of products.

The motor box module and actuator body module are mounted by adopting the buckle structure, which may achieve rapid mounting without use of tools or parts like screws and bolts in the mounting.

Figure 1:
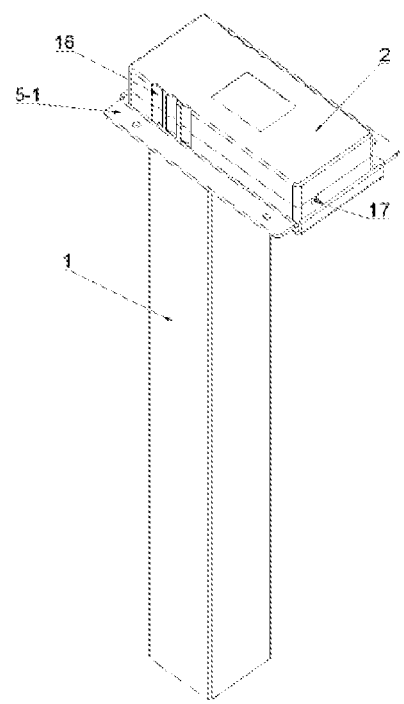
FIG. 1 is the overall diagram of the modular linear actuator in the present disclosure.

In the figures: 1. actuator body module, 2. motor box module, 3. motor box, 3-1. upper cover, 3-2. lower cover, 4. motor, 5. end plate, 5-1. horizontal mounting board, 6. transmission frame, 7. worm wheel, 8. worm, 9. multi-teeth internal spline hole, 10. multi-teeth external spline hole, 11. buckle, 12. buckle hole, 13. positioning column, 14. positioning hole, 15. motor positioning wall, 16. hand-grasp groove, 17. through wires hole, 18. desk frame, 18-1. crossbeam, 19. flexible damping material.

DETAILED DESCRIPTION

Embodiment 1: As shown in FIGS. 1-9, a modular linear actuator contains an actuator body module 1 and a motor box module 2. The motor box module 2 contains a motor box 3 in which a motor 4 and a transmission device are mounted; the motor box module 2 is detachably mounted at an end portion of the actuator body module 1; and the motor box module 2 outputs the power of the motor 4 to the actuator body module 1 through the transmission device to drive the actuator body module 1 to perform linear actions.

The actuator body module 1 contains piping fittings for the lifting upright column, and a turn-screw module to drive the piping fittings for the lifting upright column to rise or fall; the end of the piping fittings for the lifting upright column is equipped with an end plate 5; a driving input end is located on the end plate 5; and the motor box module 2 is detachably mounted on the end plate 5.

The motor box module 2 is detachably mounted at the end portion of the actuator body module 1 through the buckle structure between the motor box 3 and the actuator body module 1, and the motor box module 2 is detachably mounted at the end portion of the actuator body module 1 in the direction of linear action of the actuator body module 1.

Figure 2:
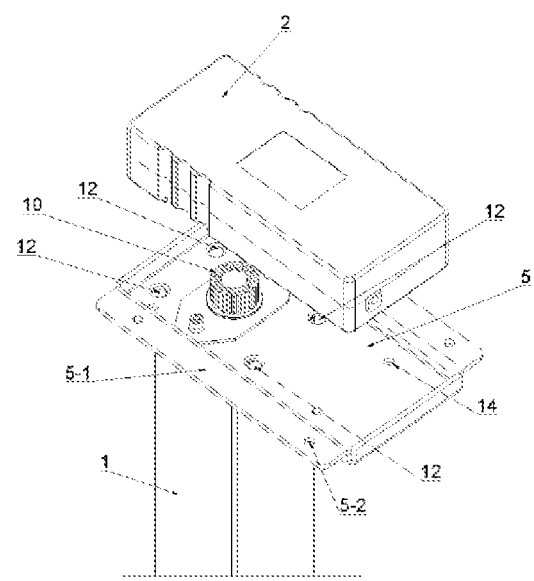
FIG. 2 is the exploded view of the modular linear actuator in the present disclosure.
Figure 3:
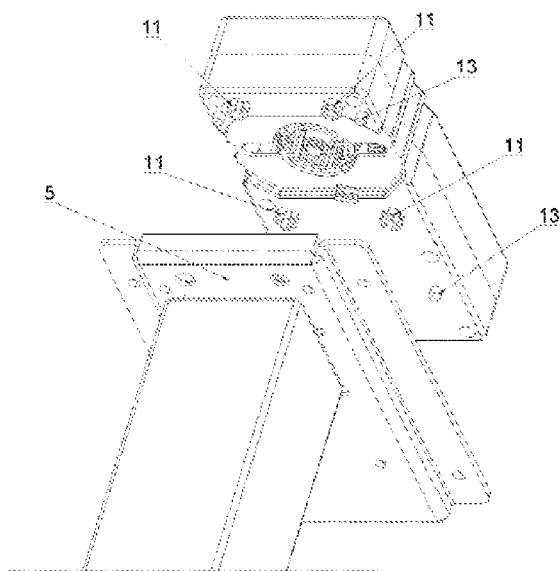
FIG. 3 is the exploded view of the modular linear actuator in the present disclosure from another perspective.
Figure 4:
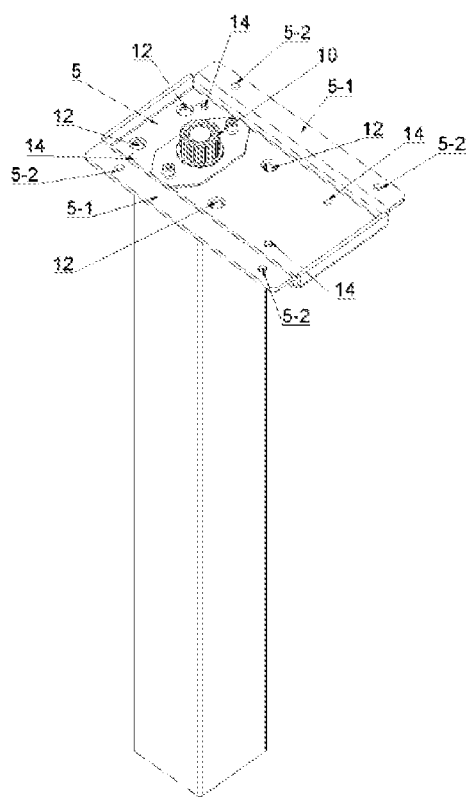
FIG. 4 is the diagram of the actuator body module in the present disclosure.

As shown in FIG. 2 and FIG. 3, specifically, the bottom of the motor box 3 is equipped with a bulging buckle 11 and the end plate 5 of the actuator body module is equipped with a buckle hole 12 so that with a buckle structure is formed between the buckle 11 and the buckle hole 12. By snapping the buckle 11 into the buckle hole 12, the motor box 3 is detachably connected to the actuator body module 1. The buckle 11 is columnar and of multi-claw type. The bottom of the motor box 3 is further equipped with a positioning column 13, and the end plate 5 of the actuator body module 1 is provided with a positioning hole 14 which coordinates with the positioning column 13 to perform assistant positioning for the motor box 3.

The motor box 3 and the buckle 11 on the bottom of the motor box 3 are shaped by integrated injection. The buckle of columnar multi-claw type is specifically in a three-claw type. The bottom of the motor box is injected with four buckles 11. By the buckle, the motor box 3 is connected directly to the end plate 5 of the actuator body module 1 with no need to use extra tools, which can achieve rapid mounting.

Figure 5:
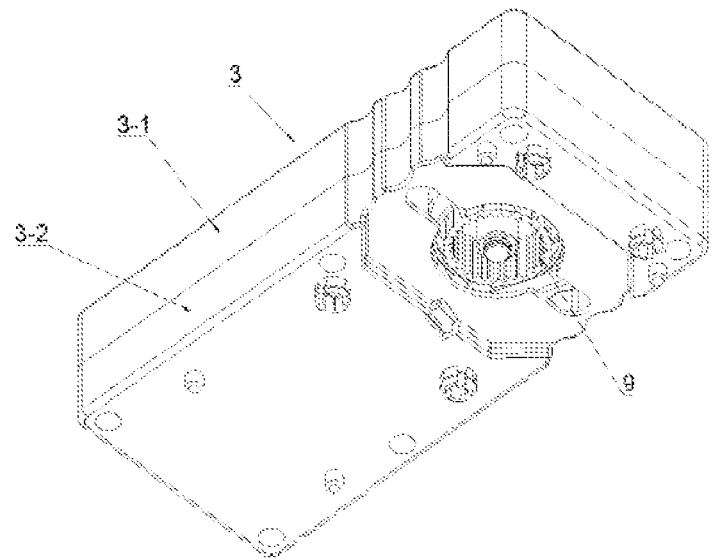
FIG. 5 is the diagram of the motor box in the present disclosure.
Figure 6:
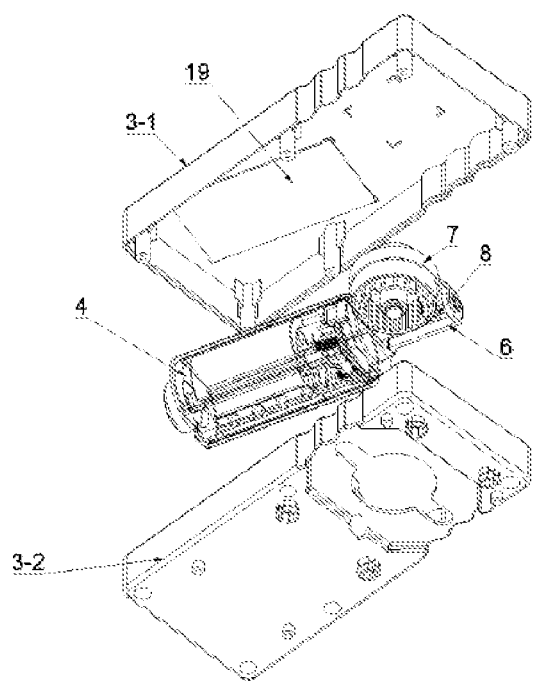
FIG. 6 is the exploded view of the motor box module in the present disclosure.
Figure 7:
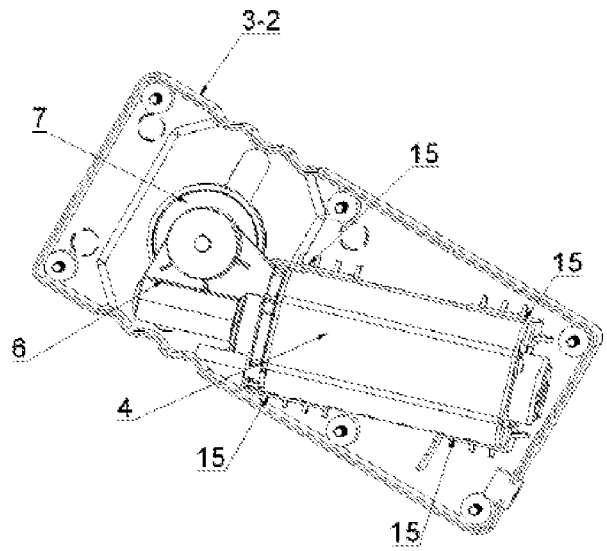
FIG. 7 is the diagram of the motor mounted inside the lower cover in the present disclosure.

As shown in FIGS. 5-7, flexible damping material 19 is provided between the motor 4 of the motor box module 2 and the motor box 3. The motor box 3 is of a two-piece unit structure containing an upper cover 3-1 and a lower cover 3-2. When the motor 4 is working, the flexible damping material 19 is capable of eliminating the noises produced by the motor and preventing the motor from moving inside the motor box 3.

The motor box 3 of the motor box module 2 is equipped inside with a circle of continuous or intermittent motor positioning wall 15. The motor 4 is embedded within the motor positioning wall 15, the sides of the motor 4 are limited by the motor positioning wall, and the top surface and bottom surface of the motor 4 are limited by the inner top surface and inner bottom surface of the motor box 3. The motor positioning wall is located on the lower cover 3-2, and the flexible damping material is located between the top surface of the motor 4 and the inner top surface of the motor box 3 and between the bottom surface of the motor 4 and inner bottom surface of the motor box 3. Both sides of the long edge of the motor box 3 are equipped with a plurality of hand grasp-grooves 16. The sides of the motor box 3 are equipped with a through wires hole 17.

As shown in FIG. 6 and FIG. 7, the transmission device within the motor box 3 of the motor box module 2 contains a transmission frame 6. A worm wheel 7 is mounted on the transmission frame which is mounted on the motor 4, the motor shaft of the motor 4 is equipped with a worm engaging with the side of the worm wheel 7. The specific structure regarding the transmission device of the motor box module 2 coordinates with the actuator body module 1 through the spline pair formed by the multi-teeth internal and the external splines to perform transmission engagement is as follows: the end of the worm wheel 7 is equipped with a multi-teeth internal spline hole 9 and a multi-teeth external spline 10 is provided on the driving input end so that when the motor box module 2 is connected to the actuator body module 1; the drive input end is inserted into the multi-teeth internal spline hole 9 of the transmission device; and an opening is provided on the motor box 3 to expose the end of the worm wheel 7. The drive input end is the dependent transmission component mounted on the head end of the screw rod of the turn-screw module, or the driving input end is the head end of the screw rod of the turn-screw module per se.

The transmission engagement performed between the transmission device of the motor box module 2 and the actuator body module 1 by the spline pair formed by the multi-teeth internal and the external splines has advantages as follows: in the process of assembly, the motor box module 2 can be adjusted within a small angle during the assembly process. In addition, the transmission contact area is increased so that the load is more even.

Figure 8:
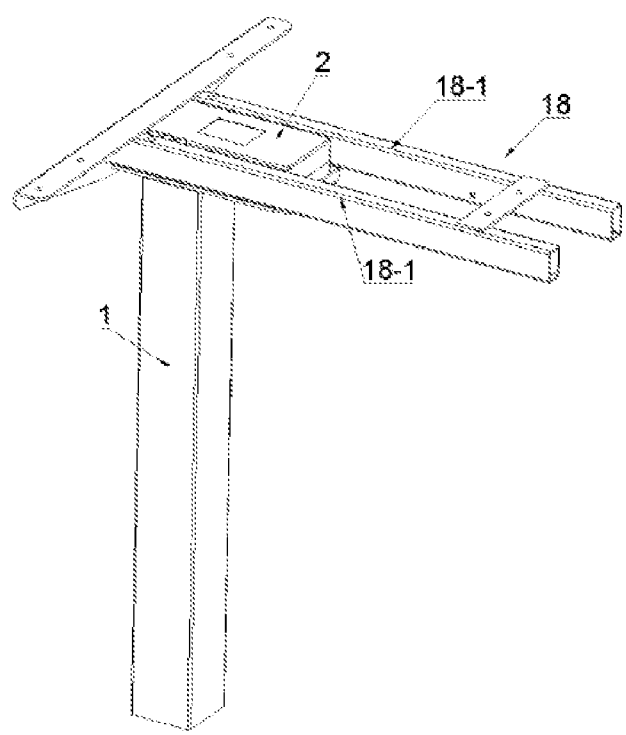
FIG. 8 is the diagram of the assembly structure of the modular linear actuator and the desk frame in the present disclosure.
Figure 9:
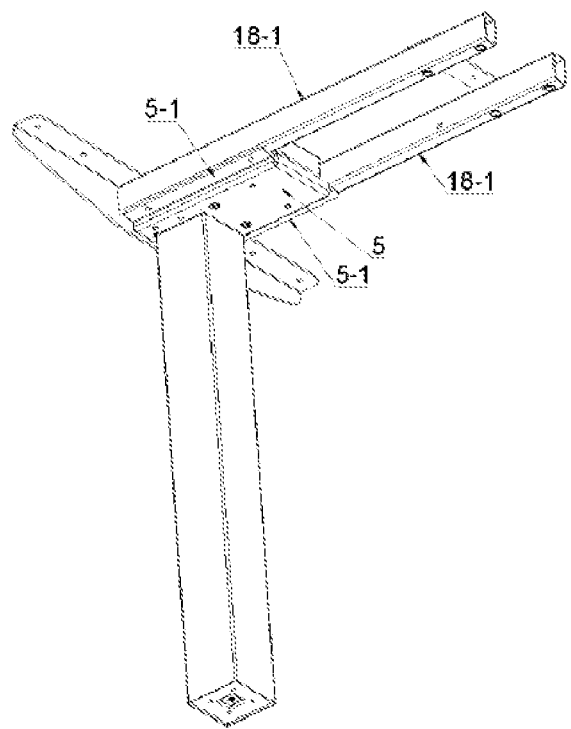
FIG. 9 is the diagram of the assembly structure of the modular linear actuator and the desk frame in the present disclosure, from another perspective.

As shown in FIG. 8 and FIG. 9, an assembly structure matching the frame of the height adjustable desk is provided on the end plate 5 of the actuator body module 1 and used for the assembly of the present modular linear actuator and the height adjustable desk frame. The assembly structure is located outside of the motor box module 2. In this embodiment, the assembly structure of the end plate 5 is specifically a horizontal mounting board 5-1 extending outwards from both sides of the end plate, equipped with a mounting hole 5-2.

The modular linear actuator performs assembly by the assembly structure, which is located outside of the motor box module 2 on the end plate 5 of the actuator body module 1, and the height adjustable desk frame, wherein the motor box module 2 can be dismounted with no need to disassemble the height adjustable desk frame.

By replacing the actuator body module 1, which can be produced with different heights of rise or fall and shapes, the modular linear actuator may satisfy the different demands of customers on the heights of rise or fall and shapes.

By replacing the actuator body module 2, which can be produced with different motor models, the different demands of customers on speed, load, and stroke may be satisfied.

Adopting spline pairs of a plurality of specifications may prevent the non-matching actuator body module 1 and motor box module 2 from being assembled together.

A height adjustable desk comprises a desk plate, a desk frame, and the above-mentioned modular linear actuator. The desk plate is mounted on the desk frame 18, which is mounted on the actuator body module 1 of the modular linear actuator.

As shown in FIG. 8 and FIG. 9, in this embodiment, the desk frame contains two crossbeams 18-1, on which the modular linear actuator is mounted by the horizontal mounting board 5-1 extending outwards from both side of the end plate 2, and between these two crossbeams 18-1 the motor box module is embedded.

The above embodiment is a preferred embodiment based on the inventive concept of the present disclosure. Under the same inventive concept there arise other embodiments, which also fall into the protection scope of this disclosure.

Embodiment 2: In Embodiment 1, the bottom of the motor box module 2 is simultaneously equipped with a buckle 11 and a positioning column 13, which enable the motor box module 2 to be detachably mounted at the end portion of the actuator body module 2, because the buckle 11 per se has the function of positioning, in particular, when the buckle 11 is of columnar multi-claw type. Thus, the positioning column 13 may be omitted. Therefore, the difference between Embodiment 2 and Embodiment 1 lies in: the bottom of the motor box module 2 is only equipped with a plurality of buckles 11 in Embodiment 2.

Embodiment 3: This embodiment is different from Embodiment 1 as to that the motor box module 2 is detachably mounted at the end portion of the actuator body module 1 by a bolt in Embodiment 3.

Embodiment 4: This embodiment is different from Embodiment 1 as to that in Embodiment 4 the transmission device of the motor box module 2 and the drive input end perform transmission engagement by the conventional transmission structure of driving pawl. Specifically, the end of the worm wheel 7 of the motor box module 2 is equipped with a driving pawl hole, while the corresponding driving pawl hole is provided on the driving input end so that when the motor box module 2 is connected to the actuator body module 1, the driving input end is inserted into the transmission pawl hole at the end of the worm wheel 7.

What is claimed is:

1. A modular linear actuator comprising: an actuator body module, a motor box module, and an end plate,
wherein the motor box module comprises: a motor box; a motor; and a transmission device, wherein both the motor and the transmission device are mounted within the motor box,
wherein the motor box module is, via a bottom side of the motor box module, directly detachably mounted on and in physical contact with a first side of the end plate through a buckle structure in a direction of linear actions of the actuator body module, and an end portion of the actuator body module is mounted on a second side of the end plate, the motor box module outputting a power of the motor to the actuator body module by the transmission device to drive the actuator body module to perform linear actions, wherein the buckle structure is formed by a bulging buckle positioned on the bottom side of the motor box module and a buckle hole positioned on the first side of the end plate, wherein the motor box module includes a first motor box module that is replaceable manually with a second motor box module having a different motor box module configuration, wherein the actuator body module includes a first actuator body module that is replaceable manually with a second actuator body module having a different actuator body module configuration, wherein:

the end plate is equipped with an assembly structure that extends horizontally outwards beyond the end portion of the actuator body module, the assembly structure includes two side portions located outside of the motor box module and arranged parallel to the end plate, each of the two side portions is configured to support a height adjustable desk frame, and the assembly structure forms a trench on the first side of the end plate for housing the motor box.

2. The modular linear actuator of claim 1, wherein transmission engagement is performed between the transmission device of the motor box module and the actuator body module by a spline pair, which is formed by multi-teeth internal and external splines.

3. The modular linear actuator of claim 1, wherein the actuator body module comprises pipe fittings for a lifting upright column and a turn-screw module to drive the pipe fittings of the lifting upright column to rise or fall, wherein an end of the pipe fittings for the lifting upright column is equipped with the end plate, a driving input end of the turn-screw module is located on the end plate, the motor box module is detachably mounted on the end plate, the transmission device and the driving input end perform transmission engagement, and the assembly structure is used for the assembly of the modular linear actuator and a lifting platform.

4. The modular linear actuator of claim 1, wherein the transmission device comprises a transmission frame, and a worm wheel mounted on the transmission frame, wherein the transmission frame is mounted on the motor, a motor shaft of the motor is equipped with a worm engaging with a side of the worm wheel, the motor box module and the actuator body module perform transmission engagement by an end of the worm wheel, and an opening is provided on the motor box to expose the end of the worm wheel.

5. The modular linear actuator of claim 2, wherein the actuator body module comprises pipe fittings for a lifting upright column and a turn-screw module to drive the pipe fittings for the lifting upright column to rise or fall, wherein an end of the pipe fittings is equipped with the end plate, a drive input end of the turn-screw module is located on the end plate, and the motor box module is detachably mounted on the end plate, wherein the driving input end is a dependent transmission component mounted on a head end of a screw rod of the turn-screw module, or the driving input end is the head end of the screw rod of a turn-screw component per se, wherein the assembly structure matches a height adjustable desk frame is used for the assembly of the modular linear actuator and the height adjustable desk frame, wherein the transmission device comprises a transmission frame, and a worm wheel mounted on the transmission frame, wherein the transmission frame is mounted on the motor and a motor shaft of the motor is equipped with a worm engaging with a side of the worm wheel, wherein the transmission device of the motor box module and the actuator body module perform transmission engagement by the spline pair formed by multi-teeth internal and external splines, with a specific structure as follows: an end of the worm is equipped with a multi-teeth internal spline hole and the driving input end is equipped with a multi-teeth external spline hole so that when the motor box module is connected to the actuator body module, the driving input end is inserted into the multi-teeth internal spline hole within the transmission device, and an opening is provided on the motor box to expose the end of the worm wheel.

6. The modular linear actuator of claim 1, wherein the motor box detachably connects to the actuator body module by snapping the bulging buckle into the buckle hole.

7. The modular linear actuator of claim 1, wherein the bulging buckle is of columnar multi-claw type, wherein the motor box is further equipped with a positioning column and a positioning hole which is provided on the end plate of the actuating body module and coordinates with the positioning column to perform assistant positioning for the motor box, wherein the assembly structure is equipped with a mounting hole.

8. The modular linear actuator of claim 1, wherein a flexible damping material is located between the motor and motor box, wherein the motor box is of a two-piece unit structure and comprises an upper cover and a lower cover.

9. The modular linear actuator of claim 8, wherein the motor box of the motor box module is equipped inside with a circle of continuous or intermittent motor-locating wall, wherein the motor is embedded within the motor-locating wall, the sides of the motor are limited by the motor-locating wall, and a top surface and bottom surface of the motor are limited by an inner top surface and an inner bottom surface of the motor box, wherein the motor-locating wall is provided on at least one of the upper cover and the lower cover, wherein the flexible damping material is located at least one of: between the top surface of the motor and the inner top surface of the motor box; and between the bottom surface of the motor and the inner bottom surface of the motor box, wherein both sides of a long edge of the motor box are equipped with a plurality of hand-grasp grooves, wherein a side of the motor box module is equipped with a through wires hole for a power cord to go through.

10. The modular linear actuator of claim 1, wherein the motor includes a first motor, and wherein a second motor of the second motor box module is different from the first motor of the first motor box module on speed, load, and/or stroke.

11. The modular linear actuator of claim 1, wherein the second actuator body module is different from the first actuator body module on heights of rise or fall and shapes.

12. A height adjustable desk comprising:
a desk plate;
a desk frame; and
a modular linear actuator of claim 1,
wherein the modular linear actuator comprises an actuator body module, a motor box module, and an end plate, wherein the motor box module comprises a motor box, a motor, and a transmission device, wherein both the motor and the transmission device are mounted within the motor box, wherein the motor box module is, via a bottom side of the motor box module, directly detachably mounted on and in physical contact with a first side of the end plate through a buckle structure in a direction of linear actions of the actuator body module, and an end portion of the actuator body module is mounted on a second side of the end plate, the motor box module outputting a power of the motor to the actuator body module by the transmission device to drive the actuator body module to perform linear actions, wherein the buckle structure is formed by a bulging buckle positioned on the bottom side of the motor box module and a buckle hole positioned on the first side of the end plate, wherein the motor box module includes a first motor box module that is replaceable manually with a second motor box module having a different motor box module configuration, wherein the actuator body module includes a first actuator body module that is replaceable manually with a second actuator body module having a different actuator body module configuration, wherein the end plate is equipped with an assembly structure that extends horizontally outwards beyond the end portion of the actuator body module, wherein the assembly structure includes two side portions located outside of the motor box module and arranged parallel to the end plate, each of the two side portions is configured to support a height adjustable desk frame, and the assembly structure forms a trench on the first side of the end plate for housing the motor box.

13. The modular linear actuator of claim 12, wherein the motor includes a first motor, and wherein a second motor of the second motor box module is different from the first motor of the first motor box module on speed, load, and/or stroke.

14. The modular linear actuator of claim 12, wherein the second actuator body module is different from the first actuator body module on heights of rise or fall and shapes.

* * * * *